(No Model.)
W. T. ANGUS.
ADJUSTABLE BUGGY.
No. 252,411. Patented Jan. 17, 1882.
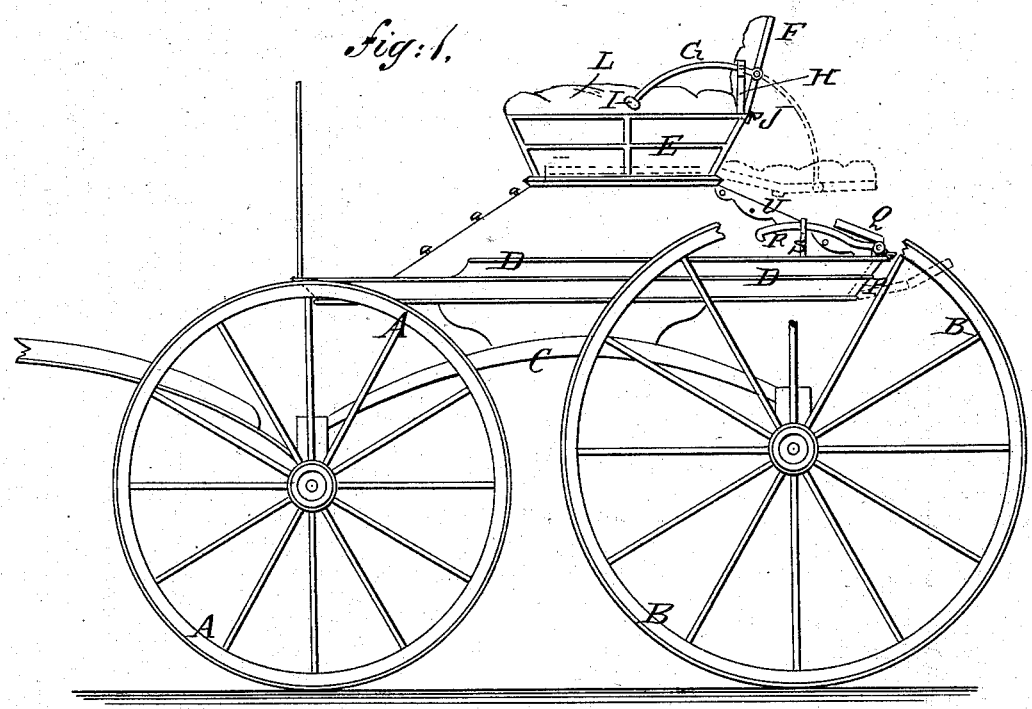
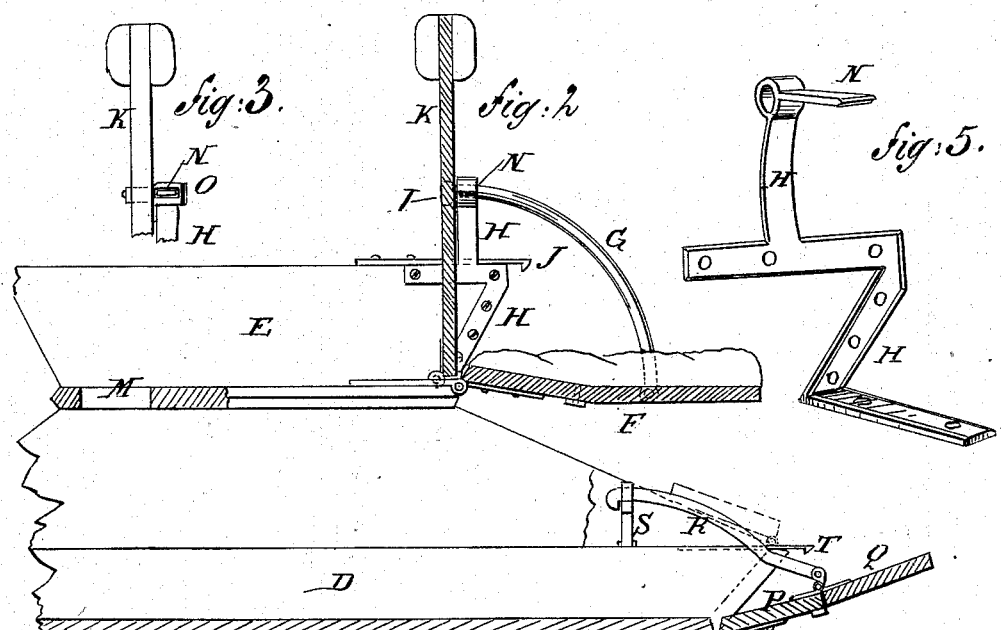
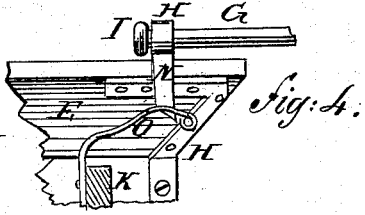
WITNESSES:
Chas. Nida
C. Sedgwick
INVENTOR:
W. T. Angus
BY Munn & Co
ATTORNEYS.

UNITED STATES PATENT OFFICE.

WILLIAM T. ANGUS, OF SYDNEY, NEW SOUTH WALES, AUSTRALIA.

ADJUSTABLE BUGGY.

SPECIFICATION forming part of Letters Patent No. 252,411, dated January 17, 1882.

Application filed December 5, 1881. (No model.) Patented in Australia September 29, 1879.

*To all whom it may concern:*

Be it known that I, WILLIAM THOMAS ANGUS, of Sydney, New South Wales, Australia, have invented a new and useful Improvement in Adjustable Buggies, of which the following is a full, clear, and exact description.

Reference is to be had to the accompanying drawings, forming part of this specification, in which similar letters of reference indicate corresponding parts in all the figures.

Figure 1 is a side elevation of a buggy to which my improvement has been applied, part being broken away. Fig. 2 is a sectional side elevation of a part of the same. Fig 3 is an end view of the forward seat back, showing one of its holding-springs. Fig. 4 is a sectional plan view of a part of the seat, showing a spring for holding the forward seat back. Fig. 5 is a perspective view of a supporting iron or bracket.

The object of this invention is to construct buggies in such a manner that they can be readily adjusted as a single-seated vehicle or a two-seated vehicle.

The invention consists in the combination, with the seat and its hinged back, of curved sliding rods and their brackets, whereby the hinged back will be supported when turned down into a horizontal position; also, in the combination, with the seat having a hinged back and its supporting-brackets having arms, of a second hinged back having spring-latches, whereby the said second back will be supported when raised into a vertical position; and, also, in the combination, with the buggy-body and the hinged end-board, of the hinged extension-board, and the curved supporting-bars and their standards, whereby the said hinged boards will be supported when turned down to serve as a foot-board, as will be hereinafter fully described.

A represents the forward wheels, B the rear wheels, C the side bars or springs, D the body, and E the seat, of an ordinary buggy.

The back F of the seat E is hinged at its lower edge to the rear edge of the bottom of the said seat, so that the said back F can be turned down into a horizontal position, as shown in dotted lines in Fig. 1 and in full lines in Fig. 2.

To the ends of the back F are attached the rear ends of curved rods G, which pass through eyes formed in the upper ends of standards or brackets H, attached to the ends of the seat E.

The forward ends of the curved rods G are provided with heads or nuts I to strike against the eyes of the standards or brackets H and limit the downward movement of the back F, and support the said back when in a horizontal position. The lower parts of the brackets H are made in angular form to fit against the ends and bottom of the seat E, and serve as braces to strengthen the seat ends.

The back F is held in place, when raised, by spring-latches J, attached to the ends of the seat E, and which engage with the ends of the back F, or with catches attached to the ends of the said back. With this construction the back F, when turned down into a horizontal position, serves as a second seat.

To the rear edge of the bottom of the seat E is hinged a second back, K, which, when only one seat is required, is turned down forward upon the bottom of the seat E, and is covered by the cushion L, the top bar of the said back K resting in a recess or opening, M, in the forward part of the seat-bottom.

The back K, when raised into a vertical position for use, rests against arms N, formed upon the brackets H, and is held in place by spring-latches O, attached to it, and which engage with the ends of the arms N. The ends of the arms N are beveled, and the end parts of the spring-latches O are inclined, so that the said latches will engage with the said arms automatically when the back K is raised into a vertical position. With this construction the back K serves as a back to both seats when two seats are used. The rear end-board, P, of the body D is hinged at its lower edge to the rear edge of the bottom of the said body D, and to its upper edge is hinged a board, Q, so that when the end-board P is lowered the said board Q will serve as an extension to the end-board P and serves as a foot-board for the rear seat.

To the end parts of the end-board P, or to supports attached to the said end-board, are hinged the rear ends of the bars R, which slide through eyes in the upper ends of the standards S, attached to the sides of the body D at a little distance from their rear ends.

The forward ends of the bars R have shoulders or heads formed upon or attached to them to strike against the standards S and support the foot-board P Q when turned down. The bars R are curved, as shown in Figs. 1 and 2, so that they will slide easily through the eyes of the standards S. The end-board P when raised is held in place by spring-latches T, attached to the body D, and which engage with the ends of the said board P, or with catches attached to the said end-board, the hinged board Q resting upon the supporting-bars R, as shown in full lines in Fig. 1 and in dotted lines in Fig. 2. When the boards P Q are to be lowered the boot-leather U is rolled up or folded beneath the seat E.

Having thus described my invention, I claim as new and desire to secure by Letters Patent—

1. In a buggy, the combination, with the seat E and its hinged back F, of the curved rods G and the brackets H, substantially as herein shown and described, whereby the said back will be supported when turned down into a horizontal position, as set forth.

2. In a buggy, the combination, with the seat E, having a hinged back, F, and the brackets H, having arms N, of the second hinged back, K, having spring-latches O, substantially as herein shown and described, whereby the said second back will be supported when raised into a vertical position, as set forth.

3. In a buggy, the combination, with the body D and the hinged end-board P, of the hinged extension-board Q, the curved bars R, and the standards S, substantially as herein shown and described, whereby the said hinged boards will be supported when turned down to serve as a foot-board, as set forth.

WILLIAM T. ANGUS.

Witnesses:
JAMES T. GRAHAM,
C. SEDGWICK.